United States Patent [19]

Owens

[11] 4,205,526
[45] Jun. 3, 1980

[54] EMISSION CONTROL SYSTEM AND METHOD FOR INTERNAL COMBUSTION ENGINE

[76] Inventor: LeRoy Owens, 1300 W. Arlington, Lincoln, Nebr. 68522

[21] Appl. No.: 941,810

[22] Filed: Sep. 13, 1978

[51] Int. Cl.[2] .................... F02B 75/10; F01N 3/16; F02M 25/06
[52] U.S. Cl. .................... 60/278; 123/119 A
[58] Field of Search .............. 60/278, 279; 123/119 A

[56] References Cited

U.S. PATENT DOCUMENTS

| | | | |
|---|---|---|---|
| 3,013,546 | 12/1961 | Bonifield | 60/278 X |
| 3,262,437 | 7/1966 | Bradshaw | 60/278 X |
| 3,306,033 | 2/1967 | Cornelius | 60/278 |
| 3,492,980 | 2/1970 | Beck | 60/278 X |
| 3,672,340 | 6/1972 | Bomba | 60/278 X |
| 3,712,281 | 1/1973 | Ruth | 60/278 X |
| 3,739,583 | 6/1973 | Tourtellotte et al. | 60/278 X |
| 3,844,261 | 10/1974 | Garcea | 60/278 X |

*Primary Examiner*—Wendell E. Burns
*Attorney, Agent, or Firm*—Horace B. Van Valkenburgh; Richard D. Law

[57] ABSTRACT

Fresh air is introduced into the exhaust pipe leading to the muffler for an internal combustion engine, while the air and exhaust gas mixture is cooled, not only in the muffler but also in a circuitous tube which extends from the muffler to the normal discharge or tail pipe and in which a special cooler may be installed. From the outlet of the special cooling tube, which faces forwardly, a portion of the air and exhaust gas mixture, now cooled, is led from a Y-connection to the intake tube of the air filter, so that the air and exhaust gas mixture will be introduced into the intake system prior to the carburetor. A rearwardly slanting arm of the Y-connection connects the front end of the special cooling pipe with the normal tail pipe. The carburetor has one or more air bleed tubes leading into the mixture passage at or below the butterfly valves, so that at idling speeds, a small amount of fresh air is introduced, irrespective of the position of the butterfly valves, to overcome any tendency for the engine, when idling, to cough or sputter due to the introduction of an air and exhaust gas mixture to the air filter intake.

19 Claims, 9 Drawing Figures

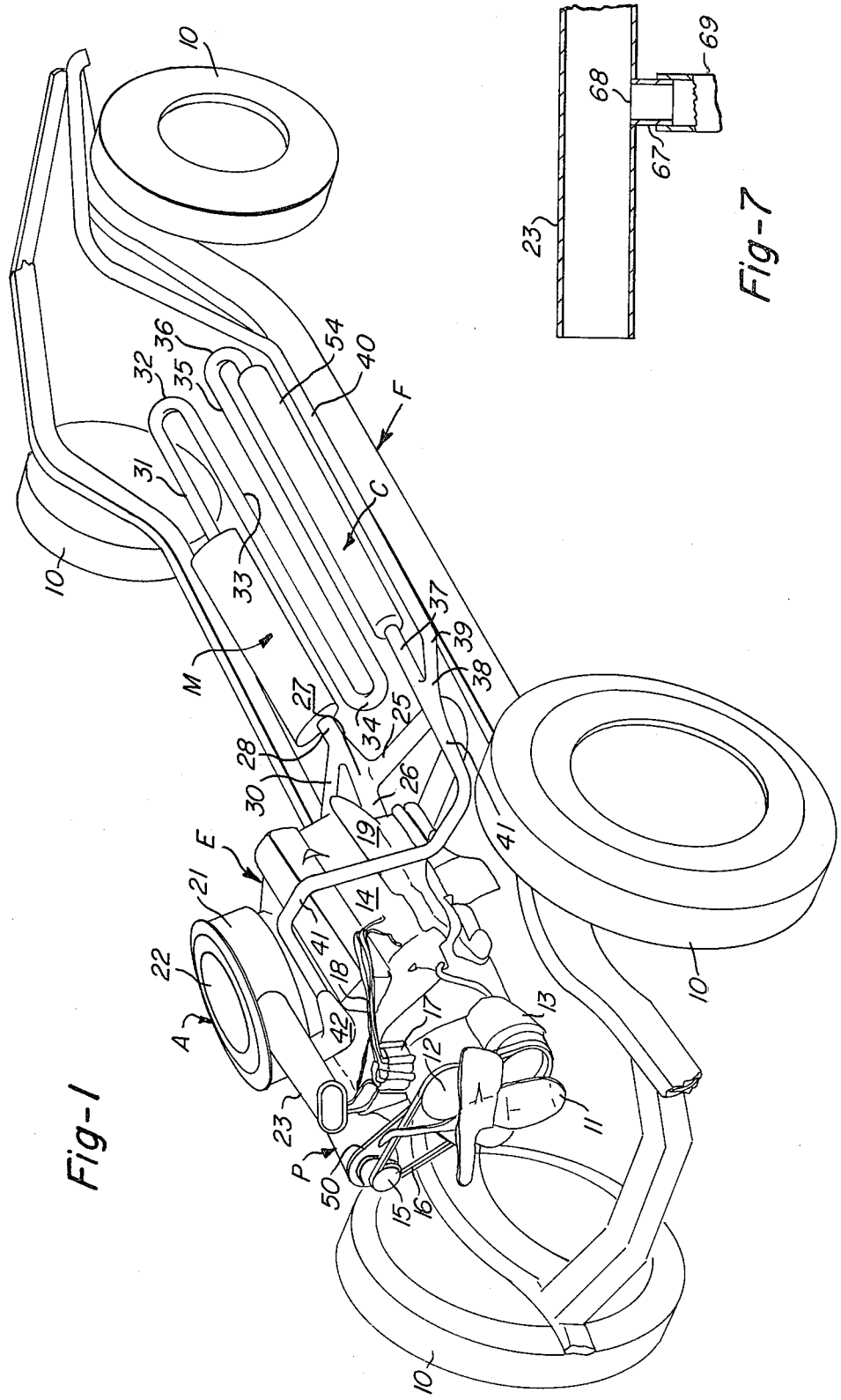

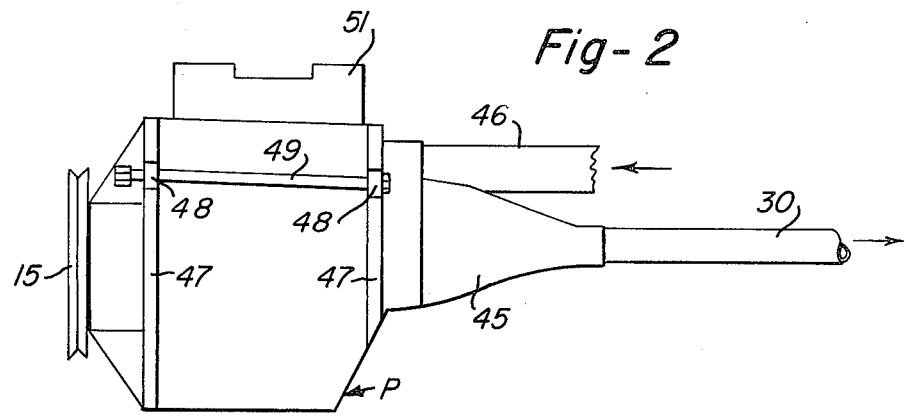
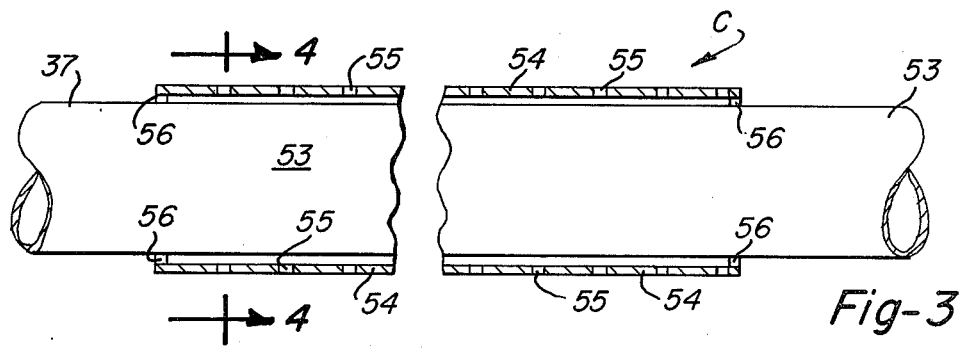
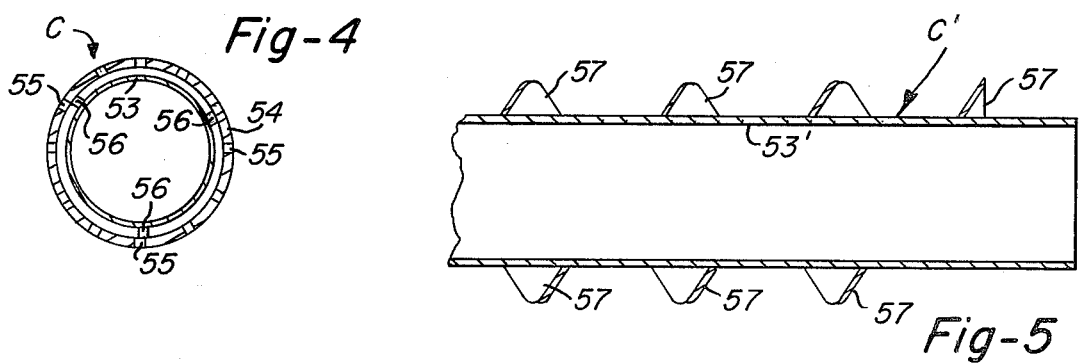
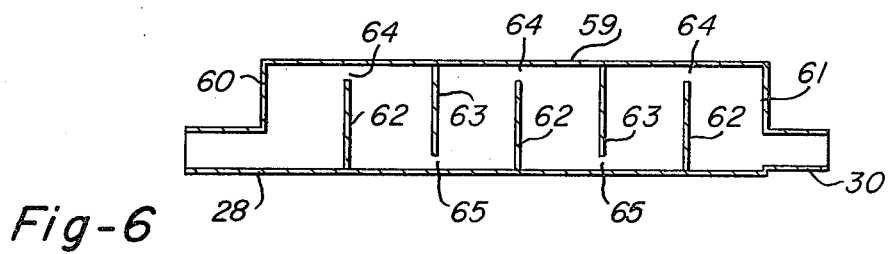

4,205,526

EMISSION CONTROL SYSTEM AND METHOD FOR INTERNAL COMBUSTION ENGINE

This invention relates to emission control systems for internal combustion engines and methods of controlling emission from internal combustion engines.

BACKGROUND OF THE INVENTION

The problem of control of the emission of noxious or deleterious fumes, vapors or the like from automobile engines has received considerable attention, resulting in numerous proposals. One proposal essentially universally adopted is the PCV which leads oil fumes from the crankcase to the engine intake. Other proposals have included the recycling of a portion of the exhaust gas, as in U.S. Pat. No. 3,237,615, by introducing somewhat cooled exhaust gas to the intake system below the carburetor by induction manifold vacuum. However, this and similar proposals have not resulted in the emission control desired, because the effective mixing of fuel with the intake air by the carburetor has been vitiated by a concentration of exhaust gases in various portions of the mixture, or concentrations in various cylinders. Although additional air has been added to the carburetor for assisting combustion during idling, as in U.S. Pat. No. 3,768,789, or supplemental air has been introduced to the intake manifold of an engine fitted with a PCV valve, as in U.S. Pat. No. 3,946,710, or between the carburetor and the intake manifold in larger quantity during engine deceleration, as in U.S. Pat. No. 3,564,580, this additional air has not been introduced in a manner corresponding to that of the present invention.

SUMMARY OF THE INVENTION

The system of this invention is especially adapted for use with an internal combustion engine having a carburetor, an air intake system for the carburetor and exhaust passages through which exhaust gases from the engine are led to a muffler and normally discharged to the atmosphere through a tail pipe. In the system of this invention, fresh air, as from a pump, is introduced into the exhaust passages, as at the pipe leading to the muffler, while the resulting air and exhaust gas mixture is cooled, not only in the muffler but also in circuitous means, such as a tube which extends from the muffler to the discharge or tail pipe. A special cooler may be interposed in this cooling tube, such as a pipe section surrounded by a larger pipe having holes for causing cooling air to flow around the pipe, or a pipe having spiral ribs on the outside for directing cooling air into engagement therewith. Or, a second muffler may be installed for cooling purposes, in lieu of the special cooler. From the outlet of the special cooling tube, which faces forwardly, a portion of the air and exhaust gas mixture, now cooled, is led to the air intake system of the carburetor, such as the air intake tube of the air filter, so that the air and exhaust gas mixture will be introduced into the intake system prior to the carburetor, to provide much better mixing of the intake air with the air-exhaust gas mixture and a consequent more thorough mixing of the fuel with the available gas containing oxygen. A forwardly facing arm of a Y-connection may connect with a tube or hose which leads to the underside of the air filter inlet tube, with the latter connection being a hose clamped to a depending tube, a connector normally used for leading warm air from a shroud surrounding a portion of the exhaust manifold, or other suitable connection. The Y-connection may be provided with a rearwardly slanting arm, which connects the front of the special cooling tube with the normal tail pipe. The carburetor has one or more bleed tubes leading into the mixture passage at or below the butterfly valves, so that at idling speeds, a small amount of fresh air is introduced, irrespective of the position of the butterfly valves, to overcome any tendency for the engine to cough or sputter when the engine is idling. The air bleed tube or tubes conveniently extend through holes drilled in the lower flange of the carburetor body and through the wall, such as cylindrical, surrounding the passage in which the butterfly valve or valves are installed. Thus, the invention is usable with a single barrel, two barrel or four barrel carburetor.

The method of this invention comprises supplying atmospheric air to the exhaust system leading to the muffler, preferably at the intake pipe of the muffler, cooling the resultant mixture of air and exhaust gases, not only in the muffler but also in a circuitous cooler, accelerating the cooling in at least a portion of the circuitous cooler and transferring a part of the cooled mixture of air and exhaust gases to the intake system of the carburetor, while discharging to atmosphere the remaining mixture of air and exhaust gases. The transferred mixture is introduced to the intake system prior to the carburetor and preferably to an intake tube of an air cleaner assembly, to take advantage of mixing in the air cleaner prior to passage through the carburetor. In addition, a small amount of air is supplied to the carburetor, irrespective of the position of the butterfly valves, to prevent coughing or sputtering of the engine while idling. This air is conveniently supplied to the carburetor mixture passage or passages at or below the butterfly valves.

THE DRAWINGS

The foregoing features, as well as additional features, will become apparent from the following description, taken in conjunction with the accompanying drawings in which:

FIG. 1 is a perspective view of an automobile chassis illustrating the application of the emission control system of this invention to the engine thereof.

FIG. 2 is a top plan view, on an enlarged scale, of an air pump utilized with the emission control system.

FIG. 3 is a longitudinal section of an exhaust gas mixture cooler shown in FIG. 1.

FIG. 4 is a cross section of the cooler taken along line 4—4 of FIG. 3.

FIG. 5 is a longitudinal section of a portion of a cooler alternative to that of FIG. 3.

FIG. 6 is a central horizontal section, on a slightly enlarged scale, of a muffler of the emission control system of FIG. 1.

FIG. 7 is a vertical section showing an alternative connection of a recirculation hose or tube to an intake tube of an air filter body.

DESCRIPTION OF THE PREFERRED EMBODIMENT

Figure 8:
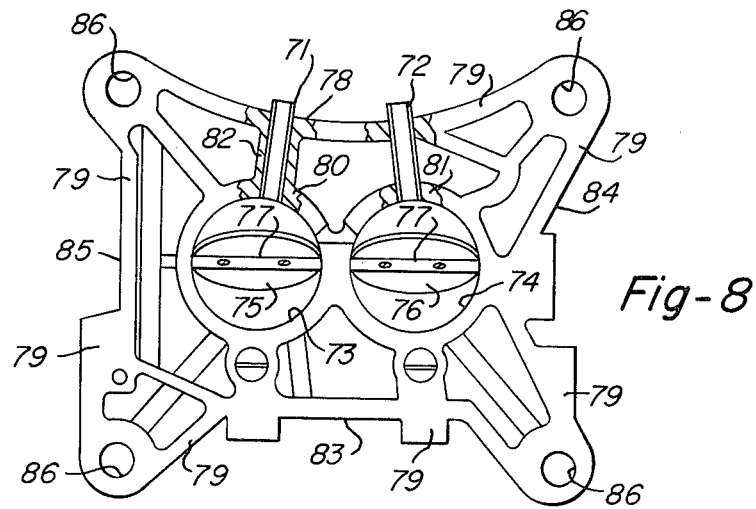
FIG. 8 is a bottom view of the face of the underside of a carburetor body, showing particularly auxiliary air inlet tubes.

As illustrated in FIG. 1, the principles of this invention may be applied to an automobile engine E mounted on a chassis which includes a frame F and a series of wheels 10. The steering column, transmission and drive train have been omitted from FIG. 1 for clarity of illustration. The engine is conventionally provided with a fan 11 driven by a belt from a pulley 12, from which another belt drives a generator 13. An air pump P, normally used to provide air which is injected into an intake cover 14 on one side of the engine and a corresponding intake cover on the opposite side, is provided with a pulley 15 driven from pulley 12 by a belt 16. The engine is also provided with a distributor 17 from which wires 18 lead to the sparkplugs on one side of the engine, and similar wires lead to sparkplugs on the other side. The engine shown is a V-8 engine, having an exhaust manifold 19 on one side and a corresponding exhaust manifold on the other side, but the invention may similarly be applied to any other style engine.

An air filter assembly A is mounted atop the engine and includes an annular body 21 having a removable top 22 which provides access to the air filter itself. Incoming air is led to the periphery of the air filter within the body 21 through an intake tube 23. A muffler M is located rearwardly of the engine, and exhaust gases are normally fed to the muffler from the exhaust pipe 25 leading from exhaust manifold 19 and a similar exhaust pipe 26 leading from the corresponding exhaust manifold on the other side of the engine. The Y-connection 27 normally connects with a muffler inlet pipe 28.

In accordance with this invention, an air tube 30 leads from the air pump P to the muffler inlet pipe 28, for supplying air to the exhaust gases at the muffler, rather than injecting it into the intake manifolds. For engines not already having an air pump, the latter may be of any desired type and driven in any convenient manner and may be located at any position, such as nearer the rear end of the engine. The air pump may be driven directly from the generator pulley, as shown, or from any other power takeoff position. The normal outlet pipe 31 of the muffler, instead of being connected to the usual tail pipe, is connected to a serpentine cooling tube which includes a 180° bend 32, then forwardly along a straight section 33 to another 180° bend 34 which connects with a rearwardly extending straight section 35, in turn connected to a third 180° bend 36. The latter connects with a cooler C which further cools the mixture of exhaust gases and air and discharges the cooled mixture through a front outlet pipe 37 which leads to a Y-connection 38. Preferably, the Y-connection 38 differs from the Y-connection 27, in that the former has two arms, whereas the latter has a single angular branch 39 which leads rearwardly to an exhaust discharge tube 40, or a tail pipe which extends in a conventional manner to the rear of the chassis.

A recirculation tube 41 extends forwardly from Y 38 to a connector 42, which recirculates a portion of the exhaust gases, such as up to 50%, to the inlet tube 23 of the air filter assembly. Of course, due to the admixture of air with the exhaust gases through the air tube 30, the exhaust gas mixture diverted to the inlet of the carburetor, which is mounted below the air filter and to which the air is fed directly downwardly, has sufficient air mixed therewith to sustain combustion, except under certain circumstances described later. The connector 42 illustrated is a connector which normally receives warm air from a shroud band which enters the exhaust manifold in order to heat some of the air supplied to the air intake, particularly for warming up the engine in cold weather, but is adapted to this use. However, other forms of connector, such as described below, may be used for an engine not having a shroud band heater installed.

The air pump P, as in FIG. 2, may be a conventional type of air pump driven by a belt running over a pulley 15, as indicated previously, and having a discharge fitting 45 which is connected to air tube 30, for discharging air through tube 30 in the direction of the arrow and to the muffler intake pipe 28. The air pump may also be provided with an air inlet tube 46, which is shown as facing rearwardly but may face in any other appropriate direction. A pair of rings 47, each having an ear 48 through which a bolt 49 may extend for clamping a slotted, arcuate bar 50 of FIG. 1, permit positioning the air pump so that the belt 16 of FIG. 1 is tight against pulley 15. The air pump may also be pivotally mounted in a conventional manner, as on a mounting bracket 51. As indicated previously, the construction, location and drive arrangement for the air pump may vary considerably.

The cooler C, as illustrated in FIGS. 3 and 4, may include a tube 53 which extends from turn 36 to outlet pipe 37 within a spaced sleeve 54. Sleeve 54 may be provided with a plurality of holes 55 which are spaced both longitudinally and circumferentially of the sleeve, while the sleeve may be spaced from tube 53 by a series of pins 56 located in circumferentially spaced positions at each end of the sleeve and also intermediate the ends, as in FIG. 4. All of the pins are preferably attached, as by welding, to the inside of sleeve 54, while pins 56 at the ends of the sleeve may also be attached, as by welding, to the outside of the tube 53. Holes 55 permit air to flow into and out of the space around tube 53, in order to extract additional heat from the exhaust gas and air mixture passing through the tube.

An alternative cooler C', illustrated in FIG. 5, may include a tube 53' similar to tube 53 of FIGS. 3 and 4, but provided on the outside with one or more spiral ribs 57 which cause a rearward, spiral circulation of air about the tube 53', for more effective cooling of the exhaust gas and air mixture passing forwardly within the tube.

The muffler M, as in FIG. 6, may be essentially conventional in construction, having a transversely oval shell 59 with front and rear end plates 60 and 61, to which the inlet pipe 28 and outlet pipe 30 are respectively connected. Within the shell are a series of transverse baffles 62 alternating with transverse baffles 63, with baffles 62 each leaving a space 64 at one side and baffles 63 each leaving a space 65 at the opposite side, the baffles and passages forming a circuitous route through which the exhaust gases weave as they move rearwardly from the front inlet pipe 28 to the rear outlet pipe 31. In addition to reducing the noise produced by the engine exhaust through passage of the exhaust gases around a baffle 62, then around an opposite baffle 63 and so on, the effect of the baffles is to transfer heat to shell 59 from which it is radiated and thereby cool the exhaust gas and air mixture. Thus, a cooler which may be utilized in lieu of the cooler C may have essentially the same construction as the muffler M.

An appropriate type of connector between recirculation tube 41 and intake tube 23 for air filter assembly A is illustrated in FIG. 7 and may include a short, depending pipe 67 affixed at a hole 68 to the underside of tube 23, while a hose 69 may be substituted for a portion or all of tube 41 of FIG. 1 and connected to pipe 67. A conventional hose clamp may be used to secure hose 69 to pipe 67, in order to recirculate a portion of the exhaust gas and air mixture to intake tube 23. As indicated previously, the connector of FIG. 7, or other suitable connector, may be utilized in lieu of the shroud connector 42 illustrated in FIG. 1.

Figure 9:
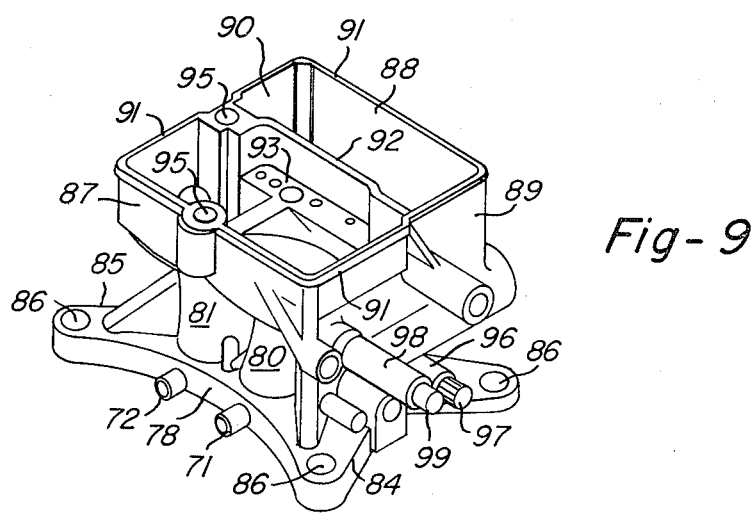
FIG. 9 is a somewhat simplified rear perspective view of the carburetor body of FIG. 8, showing also the location of the auxiliary air inlet tubes.

In further accordance with this invention, an air bleed, such as furnished by tubes 71 and 72 of FIGS. 8 and 9, is provided for the carburetor C, in order to provide additional air when the engine is idling or operating at very low speeds. In such instances, the intake vacuum is relatively low, with the exhaust pressure being correspondingly low, so that the engine may tend to sputter and stall, due to the connection of the exhaust gas and air recirculation tube 41 or hose 69 attached to the underside of the intake tube 23 of the air filter assembly. The tubes 71 and 72 permit a small amount of air to be sucked into the passages 73 and 74 in the carburetor at the butterfly valves 75 and 76, so that the supply of this relatively small amount of air is essentially independent of the position of the butterfly valves, which are pivotally mounted on a stem 77. The tubes 71 and 72 extend through a rear, laterally concave, lower flange 78, as in FIG. 9, which provides a portion of a lower gasket surface 79. Tubes 71 and 72 extend to and through the respective merging cylindrical walls 80 and 81 in which the respective passages 73 and 74 are formed. Tube 71 also conveniently extends through a rib 82 which connects flange 77 and wall 80. Holes for tubes 71 and 72 may be drilled in the body of the carburetor, if not previously provided therein.

A front lower flange 83 and side lower flanges 84 and 84, which provide continuations of lower gasket surface 79 may have irregular configurations as shown, and may be provided with bolt holes 86 for clamping the gasket between the intake passage beneath and surface 79, as well as corresponding surfaces on the underside of walls 84 and 85 and the underside of the various ribs, in addition to rib 81, which connect the merged walls 80 and 81 with the flanges 78, 83, 84 and 85. A rear wall 87, a front wall 88 and side walls 89 and 90 of FIG. 9 may have suitable configurations, such as shown, in order to accommodate the various conventional features of the carburetor disposed between the lower gasket surface 79 of FIG. 8 and the upper gasket surface 91 of FIG. 9, formed at the upper edges of walls 87 to 90 and a center rib 92. Thus a conventional (not shown) throttle plate, accelerating pump and power valve may be installed in the main body of the carburetor, while a float valve, fuel inlet and main jets (not shown) may be installed in the area bounded by walls 88, 89, 90 and rib 92. The nozzle bar and booster venturi assembly (not shown) may be installed on a ledge 93 alongside rib 92. Bolt holes 95 may extend through the upper gasket surface 91, for attaching the body of the carburetor to the bottom of an air horn (not shown), which covers the carburetor body and is, in turn, connected to the underside of the air filter assembly A. A number of bearing sleeves or bosses may be formed integrally with the side wall 89, such as a bearing sleeve 96 through which extends a ribbed extension 97 of stem 77 of butterfly valves and a boss 98 provided with a pin 99, for attachment of the choke mechanism.

As indicated previously, the tubes 71 and 72 enter the cylinders 80 and 81 at a position slightly below the closed position of the butterfly valves, so that when the engine is idling and the butterfly valves are nearly closed, the amount of air which may be drawn through the tubes 71 and 72 is significant, in comparison with the air which may pass around the butterfly valves. As indicated, at such lower settings of the butterfly valves, there may be a tendency for the engine to cough or to misfire, due to the lower proportion of fresh air in the air fuel mixture. Thus, this additional air pulled through tubes 71 and 72 increases the oxygen available in the mixture, with the result that more complete combustion is obtained in the cylinders. As will be evident, when the butterfly valves are opened to wider positions, the air pulled in through tubes 71 and 72 does not increase in volume, as does the air or mixture pulled in when the butterfly valves are opened further, and thus does not have a significant effect. Thus, the tubes 71 and 72 overcome the above tendency of the engine to sputter at low speeds when the emission control system of this invention is utilized, but do not affect the operation of the system at higher speeds.

In addition to a reduction of pollutants discharged from the tail pipe with cooling of exhaust gases and introduction of air into the exhaust gas stream just prior to the muffler, recirculation of the cooled exhaust gas mixture, containing a portion of the air introduced just prior to the muffler, has increased the mileage obtained per gallon of gasoline. The reasons for this result include setting the carburetor so that a leaner mixture is produced, which has been found to be possible with recirculation of an air and exhaust gas mixture.

Although a preferred embodiment of this invention and certain variations thereof have been illustrated and described, it will be understood that various other embodiments may exist and various changes made therein, all without departing from the spirit and scope of this invention.

What is claimed is:

1. An emission control system for an internal combustion engine having a carburetor, an air intake system for the carburetor, exhaust passage means through which exhaust gases from the engine are led to a muffler and normally discharged through a tail pipe to the atmosphere, comprising:

means for providing a supply of atmospheric air and connected to said exhaust passage means prior to said muffler;

circuitous cooling passage means leading from the exit of said muffler for cooling said mixture of air and exhaust gases;

means connecting said cooling passage means with said air intake system for said carburetor for transferring a portion of said cooled air and exhaust gas mixture to said air intake system; and means connecting said cooling passage means with means for discharge of the remainder of said cooled mixture of air and exhaust gases.

2. A system as defined in claim 1, wherein:

said engine is provided with an air filter assembly having an intake tube; and said connecting and transferring means is connected to said intake tube.

3. A system as defined in claim 1, wherein:

said atmospheric air supply means includes an air pump having an outlet; and means connecting said air pump outlet with an intake pipe of said muffler.

4. A system as defined in claim 1, wherein:
said circuitous cooling passage means includes a cooling device for increasing the cooling effect.

5. A system as defined in claim 4, wherein said cooling device comprises:
a pipe section surrounded by a pipe of larger diameter provided with holes for the passage of air therethrough and around said pipe section.

6. A system as defined in claim 4, wherein:
said cooling device comprises a pipe section provided with spiral exterior ribs.

7. A system as defined in claim 4, wherein:
said cooling device corresponds in structure to a muffler.

8. A system as defined in claim 1, including:
a Y-connection at the end of said circuitous passage means, said connection having a first arm connected with said means connected to said air intake means and a second arm connected to a tail pipe.

9. A system as defined in claim 8, wherein:
said circuitous passage means extends forwardly at the position of said Y-connection; and
said first arm extends forwardly and said second arm extends rearwardly.

10. A system as defined in claim 1, wherein:
said engine is provided with an air filter assembly having an inlet tube; and
said connecting and transferring means includes a tubular member connected to the underside of the inlet tube of said air filter assembly.

11. A system as defined in claim 10, wherein:
said air filter inlet tube is provided with a depending tube to which said tubular member is connected.

12. A system as defined in claim 1, wherein:
said carburetor is provided with one or more butterfly valves; and
means for supplying a small amount of air to said engine independently of the position of each butterfly valve and when each butterfly valve is in a position corresponding to idling of said engine.

13. A system as defined in claim 12, wherein:
said carburetor is provided with a cylindrical passage for each butterfly valve; and
said means for supplying a small amount of air leads to the respective passage at or below the corresponding butterfly valve.

14. A system as defined in claim 13, wherein:
said means for supplying a small amount of air includes one or more tubes extending from the exterior of said carburetor to the interior of the respective passage.

15. A system as defined in claim 1, wherein:
said atmospheric air supply means includes an air pump having an outlet;
means connecting said air pump outlet with an intake pipe of said muffler;
said circuitous cooling passage means includes a cooling device for increasing the cooling effect;
said engine is provided with an air filter assembly having an inlet tube;
said connecting and transferring means includes a tubular member connected to the underside of the inlet tube of said air filter assembly;
said carburetor is provided with one or more butterfly valves and a cylindrical passage for each butterfly valve; and
a tube extending from the exterior of said carburetor to the interior of each said passage at a position at or below the corresponding butterfly valve for supplying a small amount of air to said engine independently of the position of each butterfly valve and when each butterfly valve is in a position corresponding to idling of said engine.

16. A system as defined in claim 15, including:
a Y-connection at the end of said circuitous passage means, said circuitous passage means extending forwardly at the position of said Y-connection;
said Y-connection including a first arm extending forwardly and connected to said connecting and transfer means; and
said Y-connection including a second arm extending rearwardly and connected to a rearwardly extending tail pipe.

17. A method of controlling emission from an internal combustion engine having a carburetor, an air intake system for the carburetor, exhaust passage means through which exhaust gases from the engine are led to a muffler and normally discharged through a tail pipe to the atmosphere, comprising:
supplying atmospheric air to said exhaust passage means adjacent said muffler;
cooling the air and exhaust gas mixture from said muffler by passing the same along a circuitous path;
transferring a part of the cooled air and exhaust gas mixture from the end of said circuitous path forwardly to said intake air system prior to said carburetor; and
discharging the remainder of said mixture of air and exhaust gases rearwardly from the end of said circuitous path.

18. A method as defined in claim 17, wherein said carburetor is provided with at least one butterfly valve and a passage in which each butterfly valve is disposed, including:
supplying a relatively small amount of atmospheric air to each butterfly valve passage, irrespective of the position of said butterfly valve and when said butterfly valve is in a position corresponding to idling of the engine.

19. A method as defined in claim 18, wherein said engine is provided with an air filter assembly, for supplying air to said carburetor and having an intake tube, said method including:
transferring said part of said cooled air and exhaust gas mixture from the end of said circuitous path to said intake tube of said air filter assembly; and
accelerating the cooling of said air and exhaust gas mixture along at least a portion of said circuitous path.

* * * * *